United States Patent [19]

Geke et al.

[11] Patent Number: 4,612,058
[45] Date of Patent: Sep. 16, 1986

[54] COMPOSITIONS FOR REMOVING POLYMERIC FILMS

[75] Inventors: Juergen Geke; Dieter Meyer, both of Duesseldorf, Fed. Rep. of Germany

[73] Assignee: Henkel Kommanditgesellschaft auf Aktien, Duesseldorf, Fed. Rep. of Germany

[21] Appl. No.: 756,937

[22] Filed: Jul. 19, 1985

Related U.S. Application Data

[63] Continuation of Ser. No. 607,331, May 4, 1984, abandoned.

[30] Foreign Application Priority Data

May 7, 1983 [DE] Fed. Rep. of Germany ....... 3316876

[51] Int. Cl.$^4$ .......................... C09D 9/00; C09D 9/04; C11D 3/30; C11D 7/32
[52] U.S. Cl. ........................................ 134/38; 134/140; 252/117; 252/118; 252/153; 252/170; 252/171; 252/173; 252/174.16; 252/174.17; 252/174.21; 252/174.23; 252/544; 252/547; 252/548; 252/558; 252/DIG. 14; 427/154; 427/155; 427/156
[58] Field of Search ............................. 134/26, 38, 40; 252/117, 118, 153, 156, 158, 162, 170, 171, 173, 174.16, 174.17, 174.21, 174.23, 174.24, 547, 548, 558, DIG. 8; 427/299, 300, 154, 155, 156

[56] References Cited

U.S. PATENT DOCUMENTS

| | | | |
|---|---|---|---|
| 3,580,972 | 5/1971 | Isaksen | 427/154 |
| 3,663,447 | 5/1972 | Murphy | 252/156 |
| 3,886,099 | 5/1975 | Hall | 252/548 |
| 4,071,639 | 1/1978 | Palmer | 427/154 |
| 4,077,896 | 3/1978 | Bunegar | 252/90 |
| 4,140,647 | 2/1979 | Mizutani et al. | 252/89 |
| 4,200,671 | 4/1980 | Krajewski | 427/154 |
| 4,202,800 | 5/1980 | Ciko | 252/543 |
| 4,315,957 | 2/1982 | Hereth | 427/155 |
| 4,353,745 | 10/1982 | Ebbeler | 134/38 |
| 4,372,788 | 2/1983 | Lancz | 134/4 |

FOREIGN PATENT DOCUMENTS

| | | |
|---|---|---|
| 037640 | 10/1981 | European Pat. Off. |
| 2263311 | 7/1973 | Fed. Rep. of Germany |
| 2631859 | 1/1978 | Fed. Rep. of Germany ...... 252/548 |
| 2926197 | 1/1981 | Fed. Rep. of Germany |
| 2295100 | 7/1976 | France |
| 50-67845 | 6/1975 | Japan |
| 54-07303 | 4/1979 | Japan |

*Primary Examiner*—Dennis L. Albrecht
*Attorney, Agent, or Firm*—Ernest G. Szoke; Henry E. Millson, Jr.

[57] ABSTRACT

Liquid, solvent-free, aqueous compositions for the removal of film-forming polymeric protective coatings. The compositions contain a combination of alkanolamines and hydrotropic substances acting as solution promoters. Optionally, pH-regulating acids, thickeners, surfactants, corrosion inhibitors, biocides and/or dyes are added.

7 Claims, No Drawings

COMPOSITIONS FOR REMOVING POLYMERIC FILMS

This application is a continuation of application Ser. No. 607,331, filed May 4, 1984, now abandoned.

BACKGROUND OF THE INVENTION

1. Field of the Invention

This invention relates to liquid, solvent-free aqueous preparations for removing film-forming polymeric protective coatings, containing a combination of alkanolamines and hydrotropic substances acting as solution promoters, optionally together with pH-regulators, thickeners, surfactants, corrosion inhibitors, biocides and/or dyes.

2. Description of the Prior Art

Consumer goods surface-treated with lacquers or paints of various origin, for example automobile bodies, window frames of metal or the like, may be provided with film-forming polymeric protective coatings for protection against mechanical damage and the effects of weather during transport and/or storage. These protective coatings may cover any materials which are used, for example, on the exterior of an automobile body, such as lacquered and metallic surfaces, plastics, rubber and glass.

The materials used for protective coatings such as these, particularly for automobile bodies, are generally waxes which are applied with organic solvents, preferably hydrocarbons or lower monohydric alcohols. More recently, solvent-containing and aqueous polymer dispersions have also been available on the market for coating automobile bodies.

When the articles coated with the polymeric protective film are prepared for use, the polymer film is removed. In many cases, this is done using the same organic solvents that were used in the application of the protective layers, i.e. preferably organic solvents, such as hydrocarbons or lower monohydric alcohols. The use of alkaline inorganic products in cleaning solutions for removing polymeric protective coatings is known from Japanese Pat. No. 75 67 845. Disadvantages of the above-mentioned cleaning processes include pollution of the waste water by organic solvents and/or the inorganic salts, which is made even more serious by the fact that the waste water accumulating has to be neutralized. In addition, the alkaline products endanger the coated materials used, particularly lacquered surfaces. Discoloration of the metals used, staining or oxidation, and embrittlement or swelling of plastics and rubber can all be expected to occur.

The removal of a wax-based preserving and protective coating with a mixture of water and steam at a temperature of from 90° to 95° C. is mentioned in German Application No. 29 26 197. The removal of the protective film in this way is not only very energy-intensive, it is also hazardous because of the risk of scalding with hot water or steam.

Coatings which cannot be removed with cleaner solutions, but instead have to be peeled off the articles coated therewith are described in German Application No. 22 63 311, in French Pat. No. 2,295,100 and in Japanese Application No. 79 07 303. The disadvantage of this process lies in the considerable time required for completely peeling off the protective material from the surface coated therewith, which must be regarded as impracticable. In addition, where this process is applied, residues of the coating materials generally remain behind in difficult to reach places in automobile bodies, for example.

DESCRIPTION OF THE INVENTION

The object of the present invention is to provide preparations for problem-free removal of polymeric protective layers. These compositions are intended to be free from organic solvents and to be based purely on water so that they may be classified as ecologically and toxicologically satisfactory and acceptable. This also means that, on the one hand, they do not carry a heavy salt load of their own and, on the other hand, are active in a pH-range such that the salt content is not raised by a subsequent necessary neutralization. Application at room temperature and short, practicable treatment times for removal of the polymer film are also desirable.

Surprisingly, protective polymeric films can be removed by using a combination of alkanolamines and at least one hydrotropic substance.

Accordingly, the present invention relates to liquid, solvent-free aqueous compositions for the removal of film-forming polymeric protective coatings which contain a combination of alkanolamines and substances acting as solution promoters, i.e. hydrotropic substances, optionally together with pH-regulators, thickeners, surfactants, corrosion inhibitors, biocides and/or dyes.

The substances present in the aqueous compositions of the invention for the removal of film-forming polymeric protective coatings are not active on their own. They do not separately bring about removal of the polymer film, even when applied in aqueous solutions. It is only the combination of alkanolamines and hydrotropic substances which satisfy the necessary requirements of the invention, such as rapid and complete removal and, optionally, dissolution of the polymer film.

The effective compositions contain, as alkanolamines, amines substituted 1 to 3 times by hydroxyalkyl groups containing from 1 to 4 C-atoms, diethanolamine and triethanolamine preferably being used. The aqueous compositons of the invention contain alkanolamines in concentrations of from about 3 to about 30 wt. %, preferably from about 5 to about 10 wt. %, based on the weight of the total composition.

Many compounds are suitable for use as the hydrotropic, i.e. solubility-improving, substances of the composition which produce the required effect in conjunction with the alkanolamines. Examples include monoalkylethers of di-, tri- or tetraethylene glycols and di-, tri-, or tetrapropylene glycols containing from 1 to 4 C-atoms in the alkyl radical, for example propyl dipropylene glycol. Compounds from the sulfonate group, such as alkyl, aryl, alkaryl and lignin sulfonates can also be used. It is preferred to use alkyl sulfonates containing from 8 to 18 C-atoms in the alkyl radical, benzene sulfonates, naphthalene sulfonates, toluene sulfonate, cumene sulfonate, xylene sulfonate, and other alkylbenzene sulfonates containing from 9 to 15 C-atoms in the alkyl radicals.

Other hydrotropic substances suitable for the purposes of the invention are ether sulfates and sulfates of monohydric alcohols containing from 10 to 20 C-atoms, salts of fatty acids containing from 16 to 24 C-atoms, urea, or acid esters of phosphoric acid and salts thereof. Water-soluble polymeric substances of anionic, nonionic or cationic character from the group comprising polymeric polycarboxylic acids, polyglycol ethers, polyvinyl alcohols, polysaccharide derivatives and protonated or methylated polyethylene imines and mixtures thereof can also be successfully used.

The liquid remover compositions according to the invention contain the above-mentioned hydrotropic substances in working concentrations of from about 0.3 to about 15 wt. %, preferably from about 1 to about 3 wt. %, based on the weight of the total composition. More particularly, anionic polymers are used in concentrations of from about 0.4 to about 4 wt. %, preferably from about 1 to about 2 wt. %, non-ionic polymers in concentrations of from about 0.3 to about 8 wt. %, preferably from about 1 to about 2 wt. %, and cationic poymers in concentrations of from about 0.3 to about 10 wt. %, preferably from about 2 to about 3 wt. %, all percentages being based on the weight of the total composition.

The pH-values of the working solutions of the aqueous remover compositions of the invention are in the range of from about 8.0 to about 10.5, and preferably in the range of from about 8.5 to about 9.5. However, the desired effect of the aqueous compositions of the invention is relatively independent of the pH-value within the above ranges. The pH-value is adjusted to the required level with organic or inorganic acids, for example acetic acid, isononanoic acid, phosphonic acids or, preferably, phosphoric acid.

Depending on the method used for application, it may be of advantage to adjust the aqueous solution to a suitable viscosity value. Thus, a viscous product is more suitable for manual application than a thin-flowing product, whereas low viscosity, i.e. more readily pumpable and sprayable, products suitable for recycling are selected for automatic spraying processes comparable with those of a car-wash installation. The viscosity can be adjusted as required by the addition of suitable thickeners. Preferred thickeners are polymeric polycarboxylic acids, cellulose derivatives, for example carboxymethyl cellulose or other ionic or non-ionic polymers, which, as hydrotropic substances, can also be part of the dual combination of active ingredients in the compositions of the invention.

The aqueous remover compositions can additionally contain surfactants for better wettability of the surfaces to be treated and/or for foam regulation. This is particularly necessary when the preparations are to be applied by spraying under pressures of from 1 to 3 bars. Depending on how the preparations are applied, anionic, non-ionic or cationic surfactants can be employed, with the surfactants having the same ionicity as the hydrotropic substances used. For spraying only, it is possible to use non-ionic surfactants, whereas anionic or cationic surfactants are additionally suitable for dipping techniques.

Inhibitors for zinc, lightweight and/or non-ferrous metals, such as, for example, phosphoric acid esters, benzotriazole or tolyl triazole, can also be added to the preparations of the invention. If desired, biocides, such as gluconaldehyde or isothiazolines and derivatives thereof, can also be added.

Dyes can optionally be added to enable the removal process, which takes place on application of the preparations and during detachment or dissolution of the protective film, to be more easily followed. This is not necessary in cases where colored sulfonates, such as lignin sulfonates, for example, are used as the hydrotropic component.

The aqueous compositions of the invention can be used at temperatures upwards of room temperature, e.g. from about 20° C. to about 100° C.. They are suitable both for dipping and spraying processes and also for manual application. If materials coated with a polymeric protective film are dipped into a corresponding solution containing the preparations of the invention, the migration beneath the polymer film should not last any longer than about 1 to about 2.5 minutes. Any almost completely dissolved polymer residue still adhering is flushed off by means of a water spray.

In spraying processes, coated materials are sprayed with an aqueous composition of the invention for between about 20 and about 30 seconds and, after a contact time of about 1.5 to about 2 minutes, are flushed with a jet of water, so that no residues of the polymer film remain behind. Periods of 5 minutes and longer between application of a removal solution and the complete detachment or dissolution of the polymeric protective film are presently considered to be too long and thus such prior art solutions are unacceptable for practical purposes.

Representative polymeric films which can be removed by the compositions of the present invention include polymers or copolymers of methacrylic acid, acrylic acid, or their esters, acrylamide, maleic acid or diesters thereof, vinyl acetate, vinyl butyrate, vinyl chloride, styrene, etc.

The invention is illustrated, but not limited, by the following Examples.

The formulations of the compositions of the invention (set forth in the following Examples) were tested on metal plates coated with protective films based on aqueous polymer dispersions or emulsions, or based on the solvent content of polymer dispersions, polymer emulsions, or polymer solutions, for example, with the products Eskagen 250 ®, (polybutylmethacrylate) or Skinfilm VR 56 ® (polybutylmethacrylate). Lacquered and non-lacquered metal plates coated with the above polymers were treated with the preparations of the invention by the folowing methods:

(a) Plates coated as described above were immersed in a solution of the invention until migration beneath the polymer film was discernible. In each instance, immersion did not last any longer than 1 to 2.5 minutes. The almost completely dissolved polymer residue still adhering was then quickly flushed off by a jet of water.

(b) Plates coated as described above were sprayed for about 20 to 30 seconds with a solution of the invention, and after a contact time of 1.5 to 2 minutes were flushed with a jet of water.

In each instance, treatment with the compositions set forth in the EXAMPLES below was followed by complete detachment or dissolution of the polymer film within the periods set forth above for the procedures used.

The compositions of the invention had the following formulations (in weight percent used, the percentages indicating the particular active substance content):

EXAMPLE 1

5% of diethanolamine
0.5% of phosphoric acid and
1% of sodium cumene sulfonate.

The desired results were also obtained when the sodium cumene sulfonate was in turn replaced by each of the following substances:

0.5% of carboxymethyl cellulose, MW 5000 (Relatin U5000 ®), or

1% of phosphoric acid ester (Triton QS 44 ®), or

1% of ricinoleic acid, or

1% of lauryl ether sulfate (Texapon NSO ®), or 1.5% of urea, or

3% of butyl diglycol, or

2% of a non-ionic solution promoter based on natural glucose (Triton CG 110 ®).

EXAMPLE 2

7% of diethanolamine, 1% of sodium toluene sulfonate, 2% of an adduct of 30 EO and 60 PO with ethylene diamine, 0.5% of phosphoric acid (EO=ethylene oxide; PO=propylene oxide).

EXAMPLE 3

5% of diethanolamine, 2% of an adduct of 8 EO with nonyl phenol, 3% of protonated polyethylene imine.

EXAMPLE 4

6% of diethanolamine, 2% of an adduct of 8 EO with nonyl phenol, 2% of polyvinyl alcohol.

EXAMPLE 5

6% of diethanolamine, 2% of an adduct of 8 EO with nonyl phenol, 2% of propyl dipropylene glycol, 1.5% of the sodium salt of a monoester of phosphoric acid and a monhydric $C_{12}$–$C_{18}$-alcohol + 10 EO.

EXAMPLE 6

8% of triethanolamine, 1% of an adduct of 8 EO with nonyl phenol, 3% of butyl diglycol, 1% of a polymeric polycarboxylic acid (Latecol D ®), 0.3% of phosphoric acid.

EXAMPLE 7

7% of triethanolamine, 2% of butyl diglycol, 1% of lauryl dimethyl benzyl ammonium chloride, 0.4% of phosphoric acid.

EXAMPLE 8

5% of diethanolamine, 2% of an adduct of 7 EO with a monohydric $C_{12}$–$C_{18}$ fatty alcohol, 2% of butyl diglycol, 1% of ethoxylated ethylene glycol (Polydiol ® 600), 0.3% of tolyl triazole, 0.5% of phosphoric acid.

EXAMPLE 9

7% of triethanolamine, 2% of an adduct of 4 EO with octyl alcohol, 2% of butyl diglycol, 2.5% of isononanoic acid.

We claim:

1. A method for removing a temporary film-forming polymeric protective coating applied for protection during transport and storage from an automobile body, wherein the temporary film-forming polymeric protective coating is a polymer or copolymer of methacrylic acid, acrylic acid, esters of methacrylic or acrylic acid, acrylamide, maleic acid or diesters thereof, vinyl acetate, vinyl butyrate, or vinyl chloride which was applied from an aqueous dispersion or emulsion, consisting essentially of the steps of (I) contacting said film-forming polymeric protective coating with a liquid aqueous composition having a pH of about 9.5 or lower consisting essentially of:
 (a) from about 3 to about 30 wt. %, based on the weight of the total composition, of an amine containing two or three hydroxyalkyl substituents, said hydroxyalkyl substituents containing from 1 to 4 C-atoms; and
 (b) from about 0.3 to about 15 wt. %, based on the weight of the total composition, of at least one hydrotropic substance wherein said at least one hydrotropic substance is selected from the following:
  (i) a monoalkyl ether of a di, tri or tetraethylene or propylene glycol, the alkyl in said monoalkyl moiety containing from 1 to 4 C-atoms,
  (ii) an alkaryl or lignin sulfonate,
  (iii) an ether sulfate of a monohydric alcohol containing from 10 to 20 C-atoms,
  (iv) a salt of a $C_{16}$–$C_{24}$ fatty acid,
  (v) urea, and
  (vi) a water-soluble, anionic, non-ionic or cationic polymeric substance selected from the group consisting of a polycarboxylic acid, a polyglycol ether, a polyvinyl alcohol, a polysaccharide derivative and a protonated or methylated polyethylene imine; and
 wherein to the extent any of the above may be considered as solvents, the composition is free from any other solvents; and II. removing any adhering dissolved polymer residue with water.

2. The method of claim 1, wherein said liquid aqueous composition further includes an effective amount of at least one additive selected from the following: (a) a pH-regulating acid selected from the group consisting of a carboxylic acid and a mineral acid, (b) a thickener, (c) a surfactant, (d) a corrosion inhibitor, (e) a biocide, and (f) a dye.

3. A method in accordance with claim 1 wherein said amine in step I (a) is selected from the group consisting of diethanolamine and triethanolamine.

4. A method in accordance with claim 3 wherein said amine is diethanolamine.

5. A method in accordance with claim 1 wherein said amine in step I (a) is present in a concentration of from about 5 to about 10 wt. %, based on the weight of the total liquid aqueous composition.

6. A method in accordance with claim 1 wherein said hydrotropic substance in step I (b) is present in a concentration of from about 1 to 3 wt. %, based on the weight of the total liquid aqueous composition.

7. A method in accordance with claim 1 wherein the liquid aqueous composition has a pH-value of from about 8.5 to about 9.5.

* * * * *